United States Patent [19]

Kluger et al.

[11] 4,398,828

[45] Aug. 16, 1983

[54] PNEUMATIC MIXING SILO

[75] Inventors: Wolfgang Kluger, Beckum; Heinz Huser, Ahlen, both of Fed. Rep. of Germany

[73] Assignee: Krupp Polysius AG, Beckum, Fed. Rep. of Germany

[21] Appl. No.: 213,498

[22] Filed: Dec. 5, 1980

[30] Foreign Application Priority Data

Jan. 21, 1980 [DE] Fed. Rep. of Germany ....... 3002030

[51] Int. Cl.[3] ........................ B01F 13/02; B65G 53/40

[52] U.S. Cl. .................................... 366/107; 222/630; 406/90; 406/138; 366/191; 366/193

[58] Field of Search ............... 366/101, 106, 107, 191, 366/341; 406/12, 90, 91, 138, 146; 222/195, 630; 99/646 S; 52/192, 195, 197

[56] References Cited

U.S. PATENT DOCUMENTS

| | | | |
|---|---|---|---|
| 4,086,706 | 5/1978 | Lesk et al. | 406/91 |
| 4,236,852 | 12/1980 | Krauss | 406/90 |
| 4,239,421 | 12/1980 | Krauss | 366/107 X |

FOREIGN PATENT DOCUMENTS

| | | | |
|---|---|---|---|
| 1201770 | 9/1965 | Fed. Rep. of Germany | 406/146 |
| 1074419 | 10/1954 | France | 406/138 |
| 53-128064 | 11/1978 | Japan | 366/101 |
| 566923 | 8/1977 | U.S.S.R. | 52/192 |

*Primary Examiner*—Philip R. Coe
*Assistant Examiner*—Joseph M. Pitko
*Attorney, Agent, or Firm*—Learman & McCulloch

[57] ABSTRACT

The invention relates to a pneumatic mixing silo comprising a storage compartment, a central mixing compartment connected thereto and at least one material inlet opening into the mixing compartment and at least one material outlet connected to the mixing compartment. A considerable improvement in the mixing effect of this mixing silo (1) may be obtained above all if the material outlet (14) is formed by an overflow from the mixing compartment (3). In addition, correcting material may be directly introduced into the mixing compartment through an additional material inlet (12).

11 Claims, 1 Drawing Figure

FIG. 1
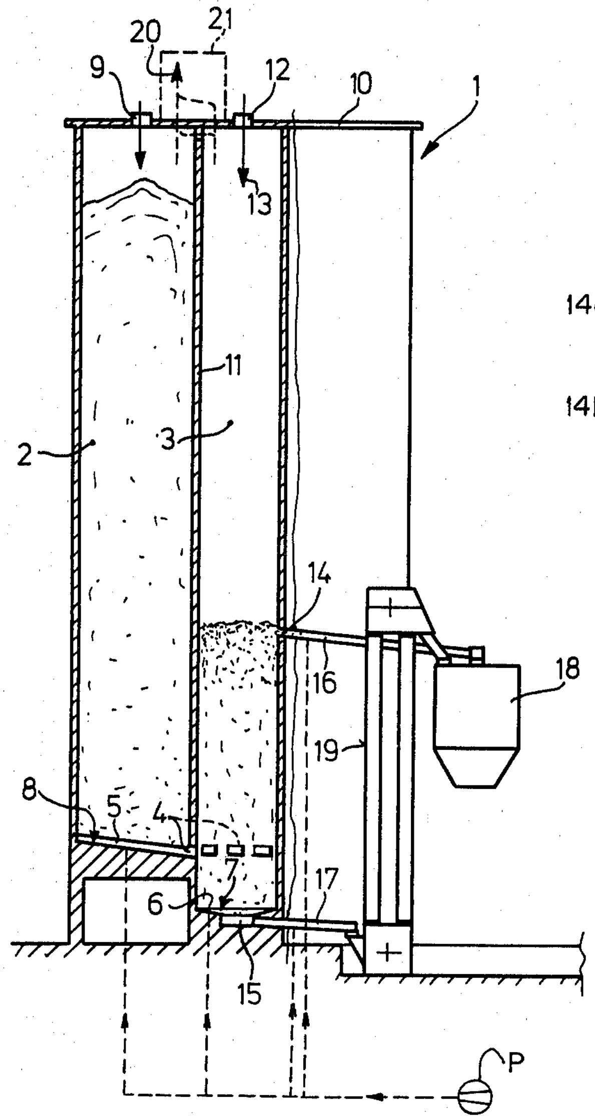
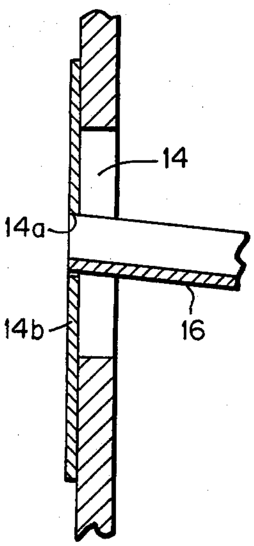
FIG. 1a

PNEUMATIC MIXING SILO

This invention relates to a pneumatic mixing silo comprising a storage compartment with base ventilation and with at least one material inlet at its upper end and a mixing compartment which is centrally arranged in the lower part of the silo and which is also provided with base ventilation, communicating with the storage compartment through gas throughflow openings provided at its lower end and comprising at least one material outlet.

A mixing silo of the type mentioned above is known for example from the Journal "Aufbereitungstechnik", No. 1/1973, page 8. In this case, the mixing compartment is formed by a relatively small chamber which is closed overhead by a conical cover provided with a ventilation pipe and of which the material outlet is situated in the region of the base of the chamber. The residence time of the material in this mixing chamber is relatively brief. Accordingly, the mixing effect is not completely satisfactory in every case. In cases where the material delivered to the mixing silo is characterised by a serious lack of uniformity and in cases where it is difficult to mix, the material generally has to be extensively premixed in the storage compartment. Since, in addition, both the material inlet and also the material outlet are situated at the lower end of the mixing chamber, inadequately mixed columns of the material are in danger of passing directly from the material inlet to the material outlet.

This disadvantage is also inherent in another known mixing silo (DE-OS No. 26 57 597), in which the mixing compartment centrally arranged in the lower part of the storage compartment communicates with the storage compartment through gas throughflow openings provided at its lower end and is connected to an expansion chamber forming the material outlet on the one hand through gas throughflow openings provided in the lower part of the mixing chamber and on the other hand through air throughflow openings situated near the cover of the mixing compartment. Accordingly, since the material inlet and material outlet are situated at substantially the same level, this known mixing silo is also attended by the danger that individual fractions of material pass through the mixing compartment too quickly and do not undergo the necessary homogenisation.

Finally, the same disadvantage is also inherent in another known mixing silo (DE-OS No. 27 24 928) which, in the lower part of the silo compartment at an interval from and below a control hood comprises a homogenising chamber to which the material is delivered via metering elements approximately midway between the upper and lower ends of the homogenising chamber and from which it is discharged either through a material outlet similarly situated midway between the upper and lower ends of the chamber below the inlet openings and just below the material level or through another material outlet provided as a bypass in the base of the homogenising chamber. Since in this case, too, the material inlet and material outlet of the homogenising chamber are situated at substantially the same level, columns of material which have just been introduced into the homogenising chamber are in danger of being immediately discharged again through the material outlet situated just below the inlet openings before being adequately homogenised in the homogenising chamber. Another disadvantage of this known mixing silo is its relatively complicated structure and the considerable amount of space which it occupies.

Accordingly, the object of the present invention is to obviate the disadvantages referred to above by constructing a mixing silo of the type mentioned at the beginning in such a way that the mixing effect is considerably improved and an excellent mixing effect is obtained even where the material shows a serious lack of homogeneity and/or is difficult to mix.

According to the invention, this object is achieved in that the material outlet is in the form of an overflow from the mixing compartment.

This prevents individual columns of material from shooting from the storage compartment into the material outlet of the mixing compartment and ensures that the entire material flowing over from the storage compartment into the mixing compartment undergoes intensive mixing in the mixing compartment before passing to the overflow of the mixing compartment and hence to the material outlet.

In one preferred embodiment of the invention, the mixing compartment comprises an additional material inlet near the top of the silo for the direct introduction of correcting material. In this way, it is possible particularly easily to correct the mixture of material leaving the silo as required without any delay.

In addition, it is favourable from the structural point of view for the wall separating the mixing compartment from the storage compartment to extend over the entire height of the silo, i.e. from the bottom to the top of the silo, in the form of a preferably cylindrical supporting wall. If the silo cover is centrally supported in this way, the thickness of the cover may be considerably reduced.

In one particularly advantageous embodiment of the mixing silo according to the invention, the level of the mixing compartment overflow is adjustable. In this way, the residence time of the material in the mixing compartment may be influenced within wide limits and hence the mixing effect may be optimally adapted to the particular application in question. In addition, it is also possible in this way conveniently to eliminate serious fluctuations in the supply of material to the storage compartment.

These and other details of the invention will become apparent from the following description of one embodiment illustrated in the accompanying drawing which is a view partly in elevation and partly in section.

FIG. 1 is a diagrammatic view, partly in elevation and partly in section, of a mixing silo constructed according to the invention.

FIG. *1a* is an enlarged, sectional view of a portion of the apparatus shown in FIG. 1.

The mixing silo 1 comprises a storage compartment 2 of annular cross-section and—arranged centrally in relation thereto—a mixing compartment 3 which at its lower end communicates with the storage compartment 2 through throughflow openings 4. Both the storage compartment 2 and also the mixing compartment 3 are provided with conventional aeratable bases 5 and 6 coupled to an aerating pump P in known manner. The base 7 of the mixing compartment 3 is preferably situated at a slightly lower level than the base 8 of the storage compartment 2. The mixing silo 1 may be provided with a single material inlet 9 or even with several material inlets, each material inlet 9 being arranged in the cover 10 of the silo and—where several material inlets are provided—all the material inlets being uniformly distributed over the cover 10 of the silo in such a way that each material inlet 9 opens into the storage compartment 2.

The common wall 11 which separates the mixing compartment 3 from the storage compartment 2 is best in the form of a cylindrical supporting wall which extends over the entire height of the silo 1, i.e. from the base (7, 8) to the cover 10 of the silo. This results in the formation of a mixing compartment 3 in the form of a cylindrical silo cell centrally arranged in and encircled by the storage compartment 2. At the same time, the cylindrical wall 11 may support the cover 10 of the silo at its centre.

The cover 10 of the silo further comprises—in its region covering the mixing compartment 3—another material inlet 12 through which correcting material (arrow 13) may be directly introduced into the mixing compartment 3.

A particularly important feature of this embodiment of the mixing silo is that the material outlet 14 of the mixing silo 1 is in the form of an overflow from the mixing compartment 3. The vertical position of this mixing compartment overflow (hereinafter referred to as the main outlet) may be adjustable for the purpose of adaptation to the necessary operating conditions. In the embodiment illustrated in the drawing, the main outlet 14 is situated at a level above that of the throughflow openings 4 and corresponding to approximately one third of the overall height of the mixing silo 1, although—as already mentioned—this vertical position may also be lower or higher. One manner of adjusting the level of the main outlet is illustrated in FIG. 1*a* wherein one end of a discharge conveyor 16 extends through the opening 14 and into an opening 14*a* formed in a vertically adjustable closure slide 14*b* which overlies the opening 14.

In addition to the main outlet 14, the mixing compartment 3 comprises near its base 7 an additional material outlet 15 which is used for emptying residues and which is referred to hereinafter as the residue outlet.

A discharge conveyor 17 also is associated with the residue outlet 15. Basically, each discharge conveyor 16 and 17 may be formed by any suitable horizontal conveyor, although it is possible—precisely in the case of a pneumatic mixing silo—to provide pneumatic trough conveyors 16 (for the main outlet 14) and 17 (for the residue outlet 15) as the discharge conveyors. These pneumatic trough conveyors 16, 17 may be supplied with air from the pump pin the same way as the bases 5 and 6.

For discharging the material from the mixing silo 1, it is further of advantage for the pneumatic trough conveyor 16 of the main outlet 14 to lead to a buffer container 18 which accommodates the material pending its further conveyance. To ensure that the residual material to be discharged from the residue outlet 15 by its pneumatic trough conveyor 17 can be carried off with the main material discharged from the main outlet 14 by its pneumatic trough conveyor 16, it is favourable in the described embodiment for the pneumatic trough conveyor 17 of the residue outlet 15 to be connected to the main outlet conveyor 16 or to the buffer container 18 following this conveyor by a vertical conveyor, for example—as illustrated—by an elevator 19. The material discharged from the mixing silo 1 can thus be discharged from a common point, namely the buffer container 18. The elevated arrangement of this buffer container 18 promotes the installation of fittings and other accessories for a further conveyor (not shown).

Adequate and suitable removal of the air delivered through the base ventilation means 5, 6 is another important requirement for a pneumatic silo, such as the mixing silo 1. The mixing silo 1 described here may comprise a common ventilation system (cf. arrows 20) for the storage compartment 2 and the mixing compartment 3. To this end, at least one connecting opening to the storage compartment 2 could be provided in the cylindrical wall 11 of the mixing compartment 3 immediately below the cover 10 of the silo. Alternatively, a common ventilation filter may be provided on the cover 10 of the silo, as indicated in chain lines at 21.

We claim:

1. A pneumatic mixing silo comprising an upright wall and a base forming a storage compartment for materials to be mixed; means for introducing materials to be mixed into said storage compartment adjacent its upper end; an annular wall spaced from and encircled by said upright wall and having a bottom at a level below that of said base, said annular wall and said bottom forming a mixing compartment; means for aerating said base and said bottom; a plurality of throughflow openings in said annular wall at the level of said base of said storage compartment and through which materials from said storage compartment may pass into said mixing compartment; at least one material overflow outlet in said mixing compartment at a level above that of said throughflow openings; and discharge conveyor means communicating with said overflow outlet for transporting material discharged therefrom from said silo.

2. A silo according to claim 1 including means for introducing correcting material to said mixing compartment at a level above that of said outlet opening.

3. A silo according to claim 1 wherein said overflow outlet opening is adjustable.

4. A silo according to claim 1 wherein said annular wall extends the full height of said storage compartment and supports a cover for the silo.

5. A silo according to claim 4 wherein said cover has an opening in communication with said mixing compartment for the introduction of correcting material directly into said mixing compartment.

6. A silo according to claim 1 including an additional material outlet adjacent the bottom of said mixing compartment for removing residues therefrom.

7. A silo according to claim 1 including a buffer container in communication with said conveyor means for receiving material from said mixing compartment.

8. A silo according to claim 7 including an additional material outlet in the bottom of said mixing compartment for removing residues therefrom, and further conveyor means for transporting residues from said additional outlet to said buffer container.

9. A silo according to claim 1 wherein said conveyor comprises a pneumatic trough.

10. A silo according to claim 8 wherein said further conveyor means includes a vertical conveyor.

11. A silo according to claim 1 wherein said aerating means is common to both of said compartments.

* * * * *